(12) United States Patent
Huang et al.

(10) Patent No.: US 10,340,536 B2
(45) Date of Patent: Jul. 2, 2019

(54) MODULAR FUEL CELL STRUCTURE, CASING OF THE SAME, AND FUEL CELL SYSTEM

(71) Applicant: National Taipei University of Technology, Taipei (TW)

(72) Inventors: Kuohsiu David Huang, Taipei (TW); Ting-Wei Hsu, Taichung (TW)

(73) Assignee: National Taipei University of Technology, Taipei (TW)

( * ) Notice: Subject to any disclaimer, the term of this patent is extended or adjusted under 35 U.S.C. 154(b) by 126 days.

(21) Appl. No.: 15/387,940

(22) Filed: Dec. 22, 2016

(65) Prior Publication Data

US 2017/0214066 A1 Jul. 27, 2017

(30) Foreign Application Priority Data

Jan. 21, 2016 (TW) .............................. 105101793 A

(51) Int. Cl.
| | |
|---|---|
| *H01M 12/06* | (2006.01) |
| *H01M 8/04082* | (2016.01) |
| *H01M 8/18* | (2006.01) |
| *H01M 12/08* | (2006.01) |
| *H01M 8/04276* | (2016.01) |
| *H01M 8/22* | (2006.01) |

(52) U.S. Cl.
CPC ... *H01M 8/04201* (2013.01); *H01M 8/04276* (2013.01); *H01M 8/188* (2013.01); *H01M 8/225* (2013.01); *H01M 12/06* (2013.01); *H01M 12/065* (2013.01); *H01M 12/08* (2013.01); *Y02E 60/128* (2013.01)

(58) Field of Classification Search
CPC ......... H01M 8/04201; H01M 8/04276; H01M 8/225; H01M 12/06–065; H01M 12/08
USPC .................................................. 429/402–407
See application file for complete search history.

(56) References Cited

U.S. PATENT DOCUMENTS

| | | | | |
|---|---|---|---|---|
| 3,758,342 A | * | 9/1973 | Baba ..................... | H01M 8/225 429/404 |
| 6,296,958 B1 | * | 10/2001 | Pinto ..................... | H01M 2/364 429/404 |
| 2004/0053132 A1 | * | 3/2004 | Smedley ................. | H01M 4/42 429/229 |
| 2004/0157101 A1 | | 8/2004 | Smedley | |

(Continued)

*Primary Examiner* — Jonathan G Leong
(74) *Attorney, Agent, or Firm* — Muncy, Geissler, Olds & Lowe, P.C.

(57) ABSTRACT

A modular fuel cell structure includes an anode conductive sheet, an air electrode sheet, a separating membrane, and a cathode conductive sheet stacked on a casing. The casing has a reaction vessel, and also has a first, a second, and a third flow passages, which all communicates with the reaction vessel, and are all independent. Said modular structure forms a fuel cell system with a first storage tank, a second storage tank, a retrieval device, and a feeding device which controls the first and the second storage tanks to deliver a first and a second materials to the casing. The first and the second materials are respectively injected into the reaction vessel for reaction through the first and the second flow passages, and then exhausted to the retrieval device through the third flow passage after the reaction. With the independent flow passages, the efficiency of power generation could be improved.

31 Claims, 7 Drawing Sheets

(56) References Cited

U.S. PATENT DOCUMENTS

2010/0173206 A1\* 7/2010 Wang Chen .......... H01M 8/028
 429/400
2011/0300468 A1  12/2011 Takabayashi
2014/0127593 A1   5/2014 Hong
2014/0183047 A1   7/2014 Kogan \* cited by examiner

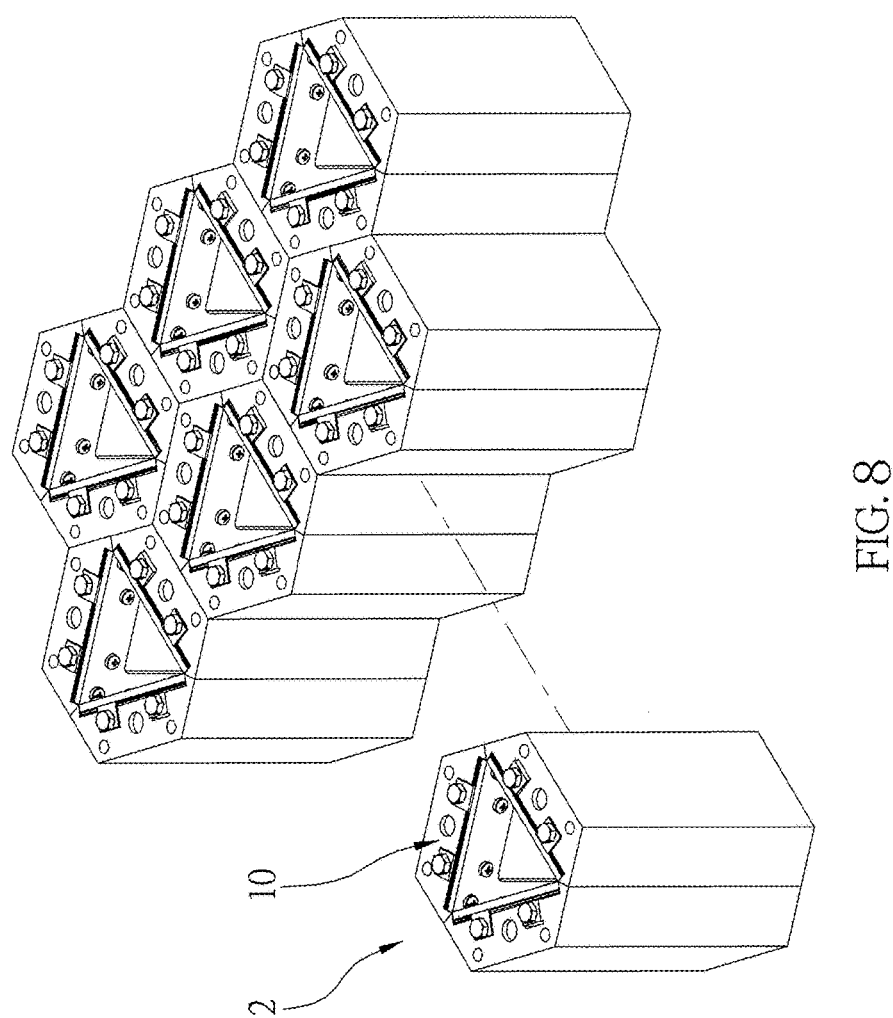

MODULAR FUEL CELL STRUCTURE, CASING OF THE SAME, AND FUEL CELL SYSTEM

BACKGROUND OF THE INVENTION

1. Technical Field

The present invention relates generally to fuel cell, and more particularly to a modular fuel cell structure, a casing of the modular fuel cell structure, and a fuel cell system.

2. Description of Related Art

After the industrial revolution in the nineteenth century, fossil fuels have become the main energy source. In addition to providing a vast amount of energy for humanity, an enormous amount of plastic products is also manufactured by using the abundant oil, coal, and natural gas on the planet. However, the cheap petrochemical energy will eventually dry up, and the world is bound to face the impact of high oil prices caused by the reduction of petrochemical capacity in the future. How to reduce the reliance on fossil fuels and appropriately use limited energy has become one of the important issues in energy policy for the whole world.

In addition to energy and economic issues, environmental issues have also received considerable attention in the international community in recent years. The problem of the greenhouse effect has been highly concerned for decades. Besides that, the heat island effect in metropolitan areas will become increasingly severe along with the development of megacities, and microscopic particles suspended in the air (e.g., PM 2.5) will also directly affect human health. Therefore, after the World Wide Views on Climate and Energy, how to provide high-performance, low-pollution energy in metropolitan areas will be an urgent and important issue for every country in pursuit of sustainable development.

Metal fuel cells have extremely high volumetric and gravimetric specific energy, and therefore are an excellent energy solution. Among the various types of metal fuel cells, zinc fuel cells have attracted particular attention since zinc in aqueous solutions and alkaline electrolytes is stable.

At present, products and related studies of zinc fuel cells all use porous zinc plate or zinc particles as the anode fuel of a battery. During the process of discharging, the reaction area of a zinc plate gradually reduces because the surface thereof reacts to become zinc oxide. As a result, the battery performance gradually reduces as well. Furthermore, the zinc anode plate of battery has to be replaced in mechanical ways after the reaction is completed, which is very inconvenient. Therefore, in order to make zinc fuel cells more practical and convenient, the form of the zinc anode thereof and the way of removing reactants must be improved.

Primary zinc-air batteries are still the only type available on the current market, which are mainly used in the hearing aids and other equipment. On the other hand, the development of secondary zinc-air batteries is still in a bottleneck, and therefore are not widely used in personal medical aids and energy systems yet. Strictly speaking, the reasons may include the following:

1. Air cathode has poor discharge power.
2. Isolation membrane has poor ionic conductivity.
3. Zinc anode cannot operate for a long time.
4. Zinc particles cannot be fully utilized as fuel.
5. The interrelated relationship between air, water and heat management system, and voltage monitoring technology still has to be integrated.

The above-described points 1 and 2 are common problems for various types of fuel cells. In recent years, as the material technology has matured, better reduction effect has been achieved for catalysts of non-precious metals and conductive materials on the air electrode, which significantly improves the efficiency of the reduction reaction. Also, regarding the separating membrane, the materials and ionic conductivity are greatly elevated as well, so that the conductive properties of the separating membrane are much better than ever.

In addition, the design of conventional fuel cells has one single fuel inlet and one single fuel outlet, and metal particles are mixed with an electrolytic solution before being injected into the reaction vessel for reaction while in use. However, with such design for battery structure, the injected fuel may not be evenly mixed, causing low performance for fuel cells. In other words, the ratio of metal particles to an electrolytic solution for the electrochemical reaction is difficult to manipulate as appropriate, for the injected electrolytic solution which contains metal particles may be mixed unevenly. As a result, there might be no sufficient metal particles in a fuel cell for reaction, leading to poor efficiency.

Thus, conventional fuel cells still have many challenges to be overcome.

BRIEF SUMMARY OF THE INVENTION

In view of the above, the primary objective of the present invention is to provide a modular fuel cell structure, a casing of the modular fuel cell structure, and a fuel cell system. Through the innovative fuel filling mechanism, and the optimization of the battery structure, the fuel applied in the battery could be fully reacted, and could be effectively removed afterwards.

The present invention provides a modular fuel cell structure, which is adapted for injecting a first material and a second material for reaction. The modular fuel cell structure includes a casing, an anode conductive sheet, an air electrode sheet, a separating membrane, and a cathode conductive sheet. The casing has a reaction vessel recessed into a surface thereof, and has a first flow passage, a second flow passage, and a third flow passage provided therein, which all communicate with the reaction vessel. The first flow passage is adapted for delivering the first material into the reaction vessel, the second flow passage is adapted for delivering the second material into the reaction vessel, and the third flow passage is adapted to exhaust the first material and the second material out from the reaction vessel after reaction. The anode conductive sheet is disposed in the reaction vessel. The air electrode sheet is disposed on a side of the anode conductive sheet opposite to the reaction vessel. The separating membrane is disposed between the anode conductive sheet and the air electrode sheet to electrically separate the anode conductive sheet and the air electrode sheet. The cathode conductive sheet is disposed on the air electrode sheet, wherein the cathode conductive sheet is electrically connected to the air electrode sheet.

The present invention further provides a casing of a modular fuel cell adapted for injecting a first material and a second material for reaction, wherein the casing has a first surface, a second surface opposite to the first surface, a first end face, and a second end face opposite to the first end face. The first end face and the second end face are both connected to the first surface and the second surface. The casing includes a reaction vessel, a first flow passage, a second flow passage, and a third flow passage. The reaction vessel is provided on the first surface, and is recessed in a direction toward the second surface, wherein the reaction vessel is adapted for mixing the first material and the second material. The first flow passage is adapted for delivering the first material into the reaction vessel, wherein one end of the first flow passage is exposed on a side of the casing near the first end face, and another end thereof communicates with a side of the reaction vessel near the second end face. The second flow passage is adapted for delivering the second material into the reaction vessel, one end of the second flow passage is exposed on the side of the casing near the first end face, and another end thereof communicates with another side of the reaction vessel near the first end face. One end of the third flow passage communicates with the side of the reaction vessel near the first end face, and another end thereof is exposed on the side of the casing near the first end face. The third flow passage is adapted to exhaust the first material and the second material out from the reaction vessel after reaction.

The present invention further provides a fuel cell system, which includes a modular fuel cell structure, a first storage tank, a second storage tank, a retrieval device, and a feeding device. The modular fuel cell structure includes a casing, an anode conductive sheet, an air electrode sheet, a separating membrane, and a cathode conductive sheet. The casing has a reaction vessel recessed into a surface thereof, and has a first flow passage, a second flow passage, and a third flow passage provided therein, which all communicate with the reaction vessel. The first flow passage is adapted for delivering a first material into the reaction vessel for reaction, the second flow passage is adapted for delivering a second material into the reaction vessel for reaction, and the third flow passage is adapted to exhaust the first material and the second material out from the reaction vessel after reaction. The anode conductive sheet is disposed in the reaction vessel. The air electrode sheet is disposed on a side of the anode conductive sheet opposite to the reaction vessel. The separating membrane is disposed between the anode conductive sheet and the air electrode sheet to separate the anode conductive sheet and the air electrode sheet. The cathode conductive sheet is disposed on the air electrode sheet, wherein the cathode conductive sheet is electrically connected to the air electrode sheet. The first storage tank is connected to the first flow passage, wherein the first storage tank is adapted for storing the first material, which is delivered into the reaction vessel through the first flow passage. The second storage tank is connected to the second flow passage, wherein the second storage tank is adapted for storing the second material, which is delivered into the reaction vessel through the second flow passage. The retrieval device is connected to the third flow passage, wherein the retrieval device is adapted to collect the first material and the second material from the modular fuel cell structure after reaction. The feeding device is respectively connected to the first storage tank and the second storage tank, and is adapted to deliver the first material and the second material to the modular fuel cell structure.

By separately injecting the first material and the second material from the first and second flow passages in the modular fuel cell structure, the proportion of the materials injected into the reaction vessel could be ensured, so that the first material and the second material could be sufficient reacted, whereby to make the fuel cell reaction more homogeneous and stable.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 7 and FIG. 8 are perspective views of practical examples applied with the modular fuel cell structure of the present invention.

DETAILED DESCRIPTION OF THE INVENTION

Figure 1:
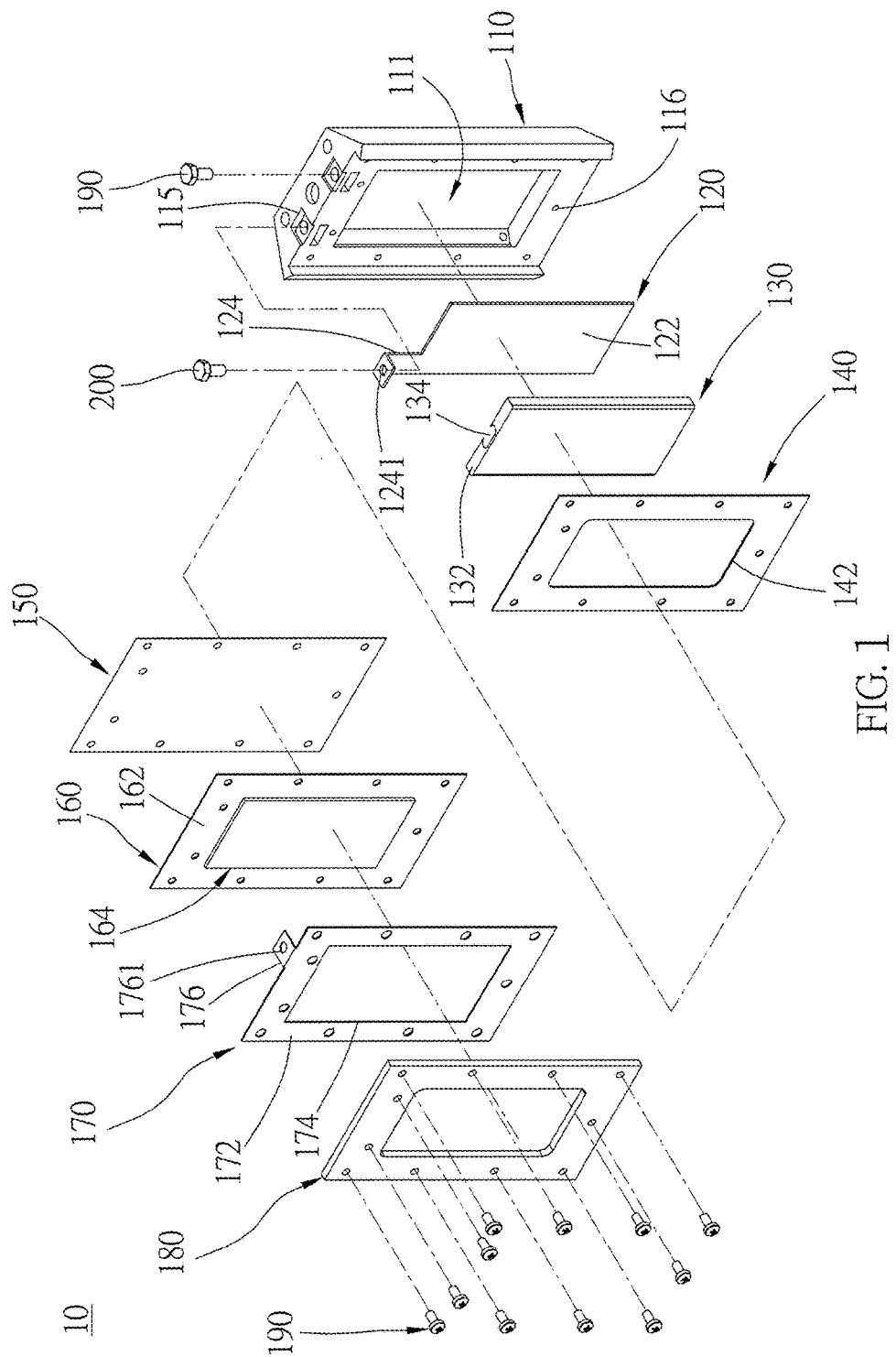
FIG. 1 is an exploded view of the modular fuel cell structure of an embodiment of the present invention.
Figure 2:
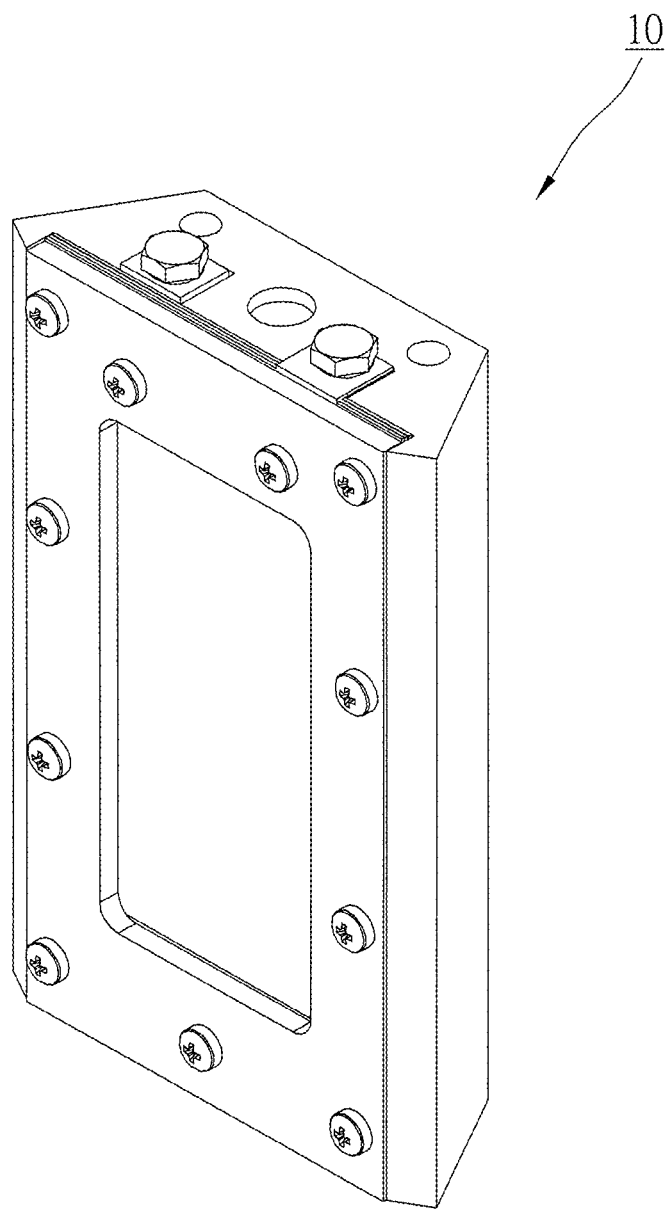
FIG. 2 is a perspective view of the modular fuel cell structure of said embodiment of the present invention.

As shown in FIG. 1 and FIG. 2, a modular fuel cell structure 10 of an embodiment of the present invention is adapted to inject a first material and a second material, so that the first material and the second material could be mixed in the modular fuel cell structure 10 for reaction, whereby to generate and output electrical power. Therefore, the first material and the second material are fuels for power generation, wherein the first material could be an electrolyte solution, while the second material could be metal particles. For example, the first material is potassium hydroxide electrolyte, and the second material is zinc particles. However, the exemplified materials are not limitations of the present invention.

The modular fuel cell structure 10 includes a casing 110, an anode conductive sheet 120, an anode conductive grid 130, a liner 140, a separating membrane 150, an air electrode sheet 160, a cathode conductive sheet 170, and a cover plate 180.

As shown in FIG. 1 to FIG. 5, the surface of the casing 110 is recessed inwardly to form a reaction vessel 111, and the casing 110 is provided with a first flow passage 112, a second flow passage 113, and a third flow passage 114, which all communicate with the reaction vessel 111. The first flow passage 112 is adapted to guide the first material into the reaction vessel 111, and the second flow passage 113 is adapted to guide the second material into the reaction vessel 111. As for the third flow passage 114, it is adapted to exhaust the mixed first and second materials out from the reaction vessel 111 after reaction. Specifically, in this embodiment, the casing 110 has a first surface 110*a*, a second surface 110*b* opposite to the first surface 110*a*, a first end face 110*c*, and a second end face 110*d* opposite to the first end face 110*c*. The first end face 110*c* and the second end face 110*d* are both connected to the first surface 110*a* and the second surface 110*b*, wherein the reaction vessel 111 is formed on the first surface 110*a*, as recessed toward the second surface 110*b*. The reaction vessel 111 is adapted to be filled with the first material and the second material, where the first material and the second material could be mixed and reacted. Also, in the reaction vessel 111, the casing 110 has a first wall 111*a*, a second the wall 111*b* facing the first wall 111*a*, a third wall 111*c*, and a fourth wall 111*d* facing the third wall 111*d*, wherein the third wall 111*c* and the fourth wall 111*d* are both connected to the first wall 111*a* and the second wall 111*b*, corresponding to the first end face 110*c* and the second end face 110*d*, respectively. In other words, the first wall 111*a*, the second wall 111*b*, the third wall 111*c*, and the fourth wall 111*d* surround the reaction vessel 111.

The first flow passage 112, the second flow passage 113, and the third flow passage 114 respectively have an opening formed on the casing 110 at positions around the first end face 110c, wherein the openings are adapted to be the material inlets for injecting the first material or the second material into the reaction vessel 111, or the material outlet for exhausting the materials out from the reaction vessel 111.

An end of the first flow passage 112 is exposed out of the casing 110 on a side near the first end face 110c, and another end thereof communicates with the reaction vessel 111 on another side near the second end face 110d. For example, said end of the first flow passage 112 is exposed on the first end face 110c to form one of the aforementioned openings, i.e., a first inlet 112a, thereon. Furthermore, said another end of the first flow passage 112 which communicates with the reaction vessel 111 is on the first wall 111a or the second wall 111b at a position near the fourth wall 111d, either forming a first outlet 112b on the first wall 111a, or forming another first outlet 112b on the second wall 111b. Alternatively, said another end of the first flow passage 112 could also form two corresponding first outlets 112b, 112c on the first wall 111a and the second wall 111b in a bifurcating manner.

An end of the second flow passage 113 is exposed out of the casing 110 on a side near the first end face 110c, while another end thereof communicates with the reaction vessel 111 on another side near the first end face 110c. For example, said end of the second flow passage 113 is exposed on the first end face 110c to form one of the aforementioned openings, i.e., a second inlet 113a, thereon, while said another end of the second flow passage 113 is exposed on the third wall 111c to form a second outlet 113b communicating with the reaction vessel 111 thereon. Furthermore, an end of the third flow passage 114 communicates with the reaction vessel 111 on a side near the first end face 110c, while another end thereof is exposed out of the casing 111 also on the side near the first end face 110. For example, said end of the third flow passage 114 is exposed on the second wall 111b to form a third inlet 114a, which communicates with the reaction vessel 111, thereon at a position near the first end face 110c. Said another end of the third flow passage 114 is exposed on the first end face 110c to form one of the aforementioned openings, i.e., a third outlet 114b, thereon. It is worth mentioning that, in the current embodiment, the aforementioned first inlet 112a, second inlet 113a, and third outlet 114b are all provided on the first end face 110c of the casing 110. Whereby, when the modular fuel cell structure 10 is applied to a fuel cell system, the conveying pipe for the first material and the second material could be easily configured and arranged. Furthermore, with the design mentioned above, it would be convenient to arrange more than one modular fuel cell structure 10 in series.

Figure 3:
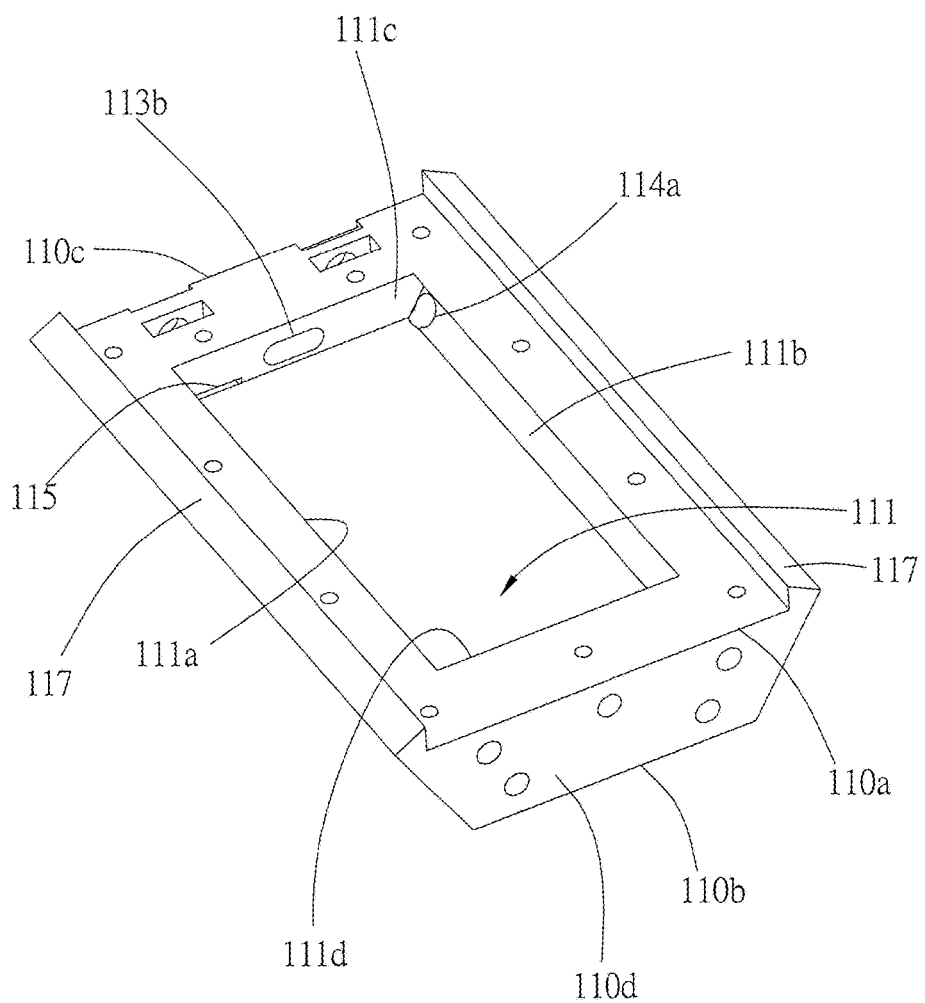
FIG. 3 is a perspective view of the casing of the modular fuel cell structure of said embodiment of the present invention.

As shown in FIG. 1 to FIG. 3, the anode conductive sheet 120 of the modular fuel cell structure 10 has an anode reaction portion 122 and an anode conduct portion 124 which are connected to each other. A slit 115 is further provided on the first end face 110c of the casing 110, corresponding to the anode conduct portion 124, wherein the slit 115 communicates with the reaction vessel 111 of the casing 110. The anode conductive sheet 120 is received in the reaction vessel 111, wherein an area of the anode reaction portion 122 could be slightly less than or equal to an area of a bottom of the reaction vessel 111. Furthermore, the anode reaction portion 122 could, but not limited to, abut against the bottom of the reaction vessel 111. The anode conduct portion 124 could, but not limited to, be integrally connected to a lateral edge of the anode reaction portion 122 which is near the slit 115. The anode conduct portion 124 extends into the slit 115, and further passes through the casing 110 via the slit 115. Also, an end of the anode conduct portion 124 which extends out of the casing 110 is bent to abut against the first end face 110c. The anode conduct portion 124 has a through hole 1241 provided thereon, which is adapted to be passed through by a fixing member 190 (such as a screw, a bolt, etc.), whereby the anode conduct portion 124 could be fixed onto the first end face 110c. The anode conduct portion 124 of the anode conductive sheet 120 is mainly used as the anode contact of the modular fuel cell structure 10.

Figure 4:
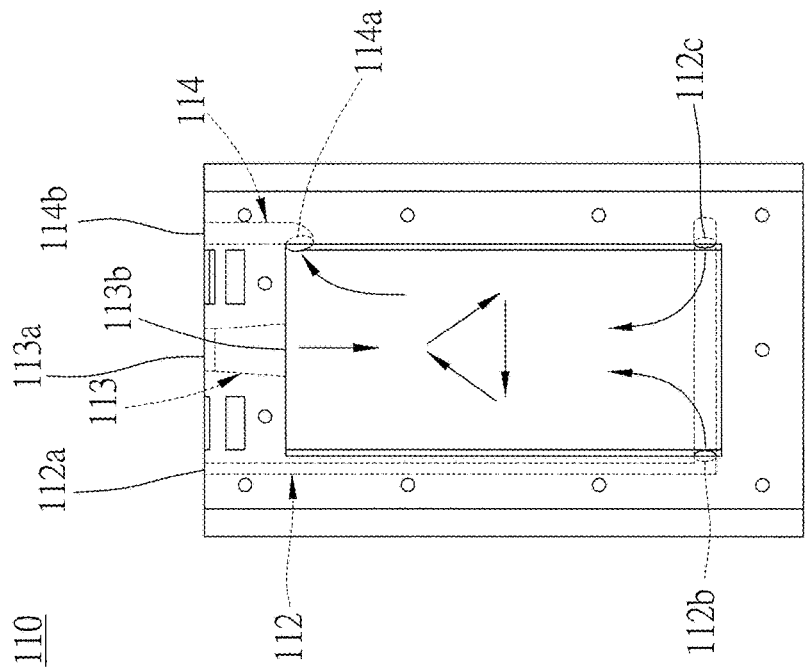
FIG. 4 is a front view of the casing shown in FIG. 3.
Figure 5:
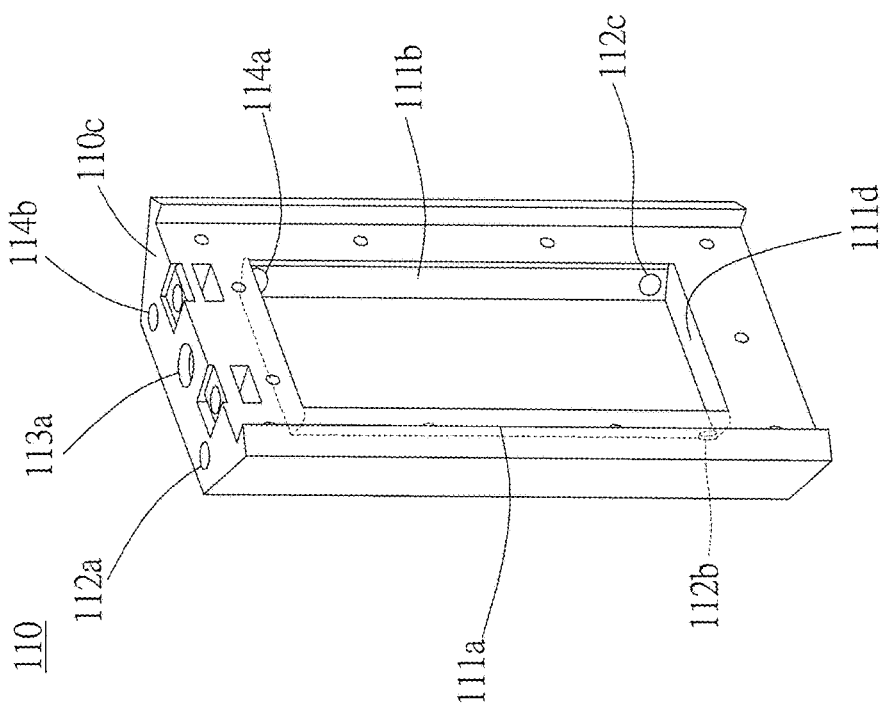
FIG. 5 is a perspective view of the casing shown in FIG. 3, which is seen in another direction.

As shown in FIG. 1, FIG. 3, and FIG. 4, the anode conductive grid 130 of the modular fuel cell structure 10 is disposed between the anode conductive sheet 120 and the liner 140, corresponding to the reaction vessel 111. The anode conductive grid 130 has at least one folded edge 132, which is bent toward the anode conductive sheet 120, and extends into the reaction vessel 111. In the current embodiment, the anode conductive grid 130 have four folded edges 132 surrounding a periphery thereof as an example, which is not a limitation of the present invention. Therefore, in this embodiment, the anode conductive grid 130 covers the anode conductive sheet 120 in the reaction vessel 111, and electrically contacts with the anode conductive sheet 120. In addition, each of the folded edges 132 of the anode conductive grid 130 could, but not limited to, abuts against the corresponding wall in the reaction vessel 111, wherein the folded edge 132 of the anode conductive grid 130 which faces the third wall 111c has a notch 134 formed thereon. The position, the shape, and the size of the notch 134 correspond to the second outlet 113b of the second flow passage 113, so as to avoid affecting the fluency while injecting the second material into the reaction vessel 111 through the second flow passage 113. It is worth mentioning that, the anode conductive grid 130 is a grid structure composed of metal materials such as nickel, stainless steel, or copper. With the meshes (not shown) in the grid structure, a contact area of the anode conductive sheet 120 could be increased, so as to increase a reaction area for the anode of a fuel cell as well. In other embodiments of the present invention, the anode conductive grid 130 could be omitted. In such cases, the reaction area of the anode of the fuel cell or the amount of power generation could be increased through different ways other than the design mentioned above.

The liner 140 of the modular fuel cell structure 10 is disposed between the separating membrane 150 and the reaction vessel 111 of the casing 110, and has an opening 142 corresponding to the reaction vessel 111, wherein an orthographic projection area of the opening 142 matches an orthographic projection area of the reaction vessels 111. While assembling the modular fuel cell structure 10, the liner 140 is attached to the first surface 110a which surrounds an outer periphery of the reaction vessel 111. Preferably, the liner 140 is made of rubber, which could improve the airtight effect, whereby to prevent the materials injected into the reaction vessel 11 from leaking. However, in practice, the liner 140 could be also made of materials other than rubber.

The separating membrane 150 of the modular fuel cell structure 10 is disposed between the anode conductive sheet 120 and the air electrode sheet 160. In the current embodiment, the separating membrane 150 is located between the liner 140 and the air electrode sheet 160. The main function of the separating membrane 150 is to separate the anode conductive sheet 120 and the air electrode sheet 160, i.e., making the anode conductive sheet 120 and the air electrode sheet 160 electrically isolated, whereby the generation of internal resistance which affects the performance of discharge of the battery could be prevented, so as to prolong the life of the battery. In the current embodiment, the separating membrane 150 is made of porous non-woven fabric. In other embodiments of the present invention, other materials such as Polytetrafluoroethylene could also be used to meet practical demands, and the selection of the aforementioned non-woven fabric is not a limitation of the present invention.

The air electrode sheet 160 of the modular fuel cell structure 10 is disposed on a side of the anode conductive sheet 120 opposite to the reaction vessel 111, and is between the separating membrane 150 and the cathode conductive sheet 170. The air electrode sheet 160 includes a plate 162 and a waterproof membrane 164, wherein the plate 162 could be made of Teflon, mixture of foamed nickel and carbon black, and cobalt catalyst, etc. However, the materials listed herein are not limitations of the present invention. The plate 162 is in contact with the separating membrane 150. The waterproof membrane 164 is disposed on a side of the plate 162 opposite to the separating membrane 150, and a periphery of the plate 162 is exposed without being covered by the waterproof membrane 162. Preferably, an orthographic projection area of the waterproof membrane 164 matches the orthographic projection area of the reaction vessels 111. The waterproof membrane 164 could not only prevent the reactive substances (e.g., electrolytes) in the reaction vessel 111 from spilling over, but also provide air permeability, so that air from outside could flow through to contact with the content inside. Whereby, the oxygen in the air could get into the inner side of the plate 162 through the waterproof membrane 164 to perform the electrochemical oxidation-reduction reaction therein. The principle is that the oxygen would be dissolved in the electrolyte first, and then diffused to the surface of the electrode to be attached to the catalyst, so as to perform the electrochemical reaction.

The cathode conductive sheet 170 of the modular fuel cell structure 10 is disposed on the air electrode sheet 160, and is between the air electrode sheet 160 and the cover plate 180. The cathode conductive sheet 170 has a cathode reaction portion 172, a hollow portion 174, and a cathode conduct portion 176, wherein the cathode reaction portion 172 has an opening corresponding to the waterproof membrane 164, and the hollow portion 174 is the portion surrounding an outer peripheral edge of the opening. The cathode conductive sheet 170 fits around the waterproof membrane 164 of the air electrode sheet 160 through the hollow portion 174, so that the cathode reaction portion 172 is attached to the exposed portion of the plate 162 (i.e., the portion which is not covered by the waterproof membrane 164) to be electrically connected to the air electrode sheet 160. The cathode conductive portion 176 is bent and connected to a lateral edge of the cathode reaction portion 172, and abuts against the first end face 110c of the casing 110. The cathode conductive portion 176 has a through hole 1761 provided thereon, which is adapted to be passed by the fixing member 190 such as a screw or a bolt to fix the cathode conduct portion 176 onto the first end face 110c of the casing 110. The cathode conductive portion 176 is mainly used as the cathode contact of the modular fuel cell structure 10.

As shown in FIG. 1 to FIG. 3, the cover plate 180 of the modular fuel cell structure 10 is disposed on a side of the cathode conductive sheet 170 opposite to the air electrode sheet 160, and is secured to the casing 110, so that the anode conductive sheet 120, the anode conductive grid 130, the liner 140, the separating membrane 150, the air electrode sheet 160, and the cathode conductive sheet 170 stacked on the first surface 110a of the casing 110 are clamped and fixed between the casing 110 and the cover plate 180. For example, these components could be assembled by using a plurality of fixing members 190 (such as screws or bolts) which pass through corresponding through holes on the components to be fixed in corresponding positioning holes 116 on the first surface 110a of the casing 10. Alternatively, these components could be fixed to the casing 110 in a snap-fit manner through some structural design.

The purpose of providing the cover plate 180 is to further press the cathode conductive sheet 170, the air electrode sheet 160, the separating membrane 150, and the liner 40 sequentially, so that each component could be stably disposed on the first surface 110a of the casing 110. It should be understandable that, in some embodiments of the present invention, if the air tightness and water tightness between each component in the modular fuel cell structure 10 is properly performed, the liner 140 and/or the cover plate 180 could be also omitted, which would facilitate the goal of lightweight without sacrificing the effect of air tightness and water tightness. Thus, in some embodiments of the present invention, the fixing members 190 directly pass through the corresponding through holes on the cathode conductive sheet 170, the air electrode sheet 160, the separating membrane 150, and the liner 140 in sequence, and then are fixed in the corresponding positioning holes 116 on the casing 110, with the cover plate 180 being omitted.

Figure 6:
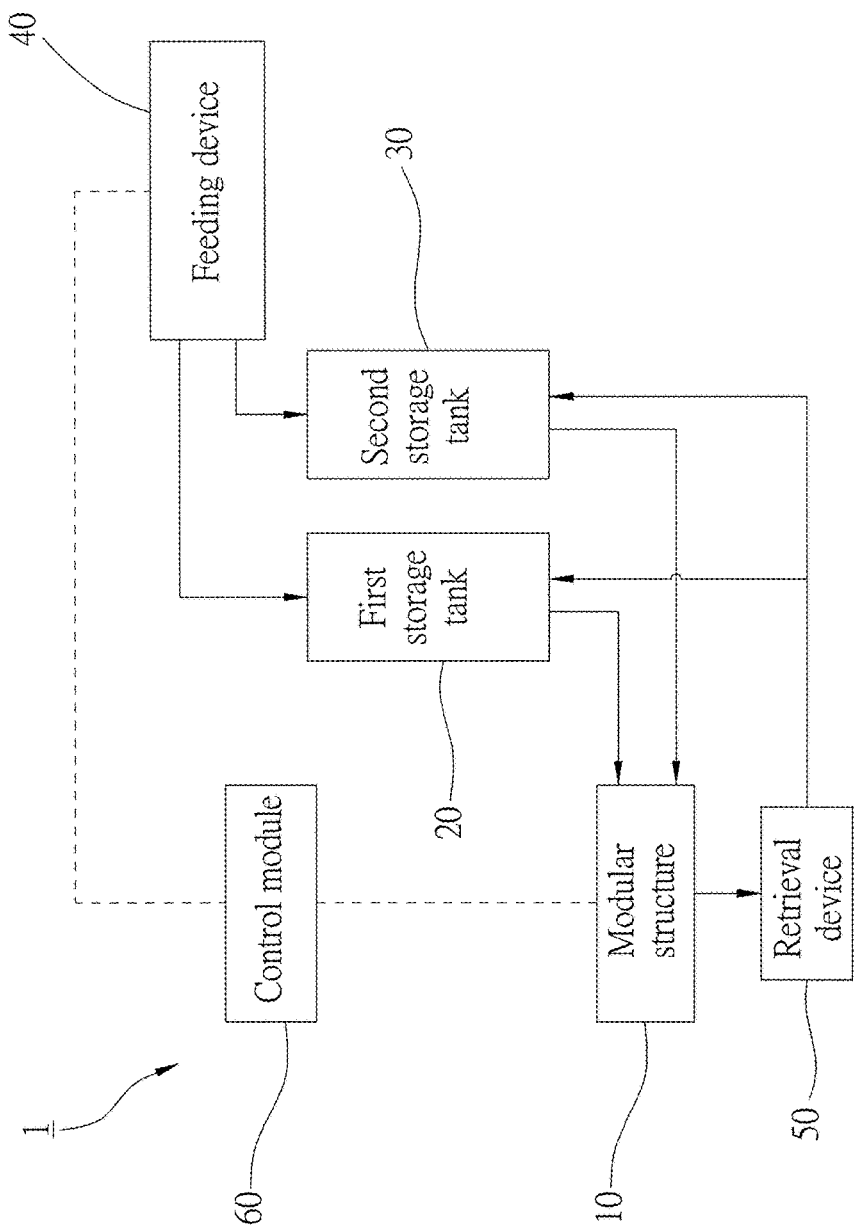
FIG. 6 is a structure diagram of the fuel cell system of an embodiment of the present invention.

As shown in FIG. 2, FIG. 4 and FIG. 6, in practice, the modular fuel cell structure 10 disclosed in the present invention is applicable to a fuel cell system 1. In addition to the modular fuel cell structure 10, the fuel cell system 1 further includes a first storage tank 20, a second storage tank 30, a feeding device 40, and a retrieval device 50, wherein the first storage tank 20 is adapted for storing the first material, and the second storage tank 30 is adapted for storing the second material.

The first storage tank 20 is connected to the first flow passage 112 of the modular fuel cell structure 10, and is adapted to supply the first material to the reaction vessel 111 via the first flow passage 112. The second storage tank 30 is connected to the second flow passage 113 of the modular fuel cell structure 10, and is adapted to supply the second material to the reaction vessel 111 via the second flow passage 113.

The feeding device 40 are respectively connected to the first storage tank 20 and the second storage tank 30, wherein the feeding device 40 includes a pump and a delivery pipeline, which are adapted to deliver the first material and the second material to the reaction vessel 111 of the modular fuel the cell structure 10 for reaction, whereby to generate electricity.

The retrieval device 50 is connected to the third flow passage 114 of the modular fuel cell structure 10, and is adapted to receive the first material and the second material from the modular modular fuel cell structure 10 after the reaction, whereby the retrieved first material and second material could be collected as waste materials or get recycled. If the first material and/or the second material could be recycled or reused after the reaction, the retrieval device 50 could be further connected to the first storage tank 20 and/or the second storage tank 30, whereby to deliver the processed first material and/or second material to the corresponding storage tank.

In addition, in the current embodiment, the fuel cell system 1 could be optionally configured with a control module 60, which is electrically connected to the modular fuel cell structure 10 and the feeding device 40, respectively. The control module 60 is adapted for detecting the voltage, the output current, and other electrical parameters of the modular fuel cell structure 10. According to these parameters, the control module 60 could control the feeding device 40 to adjust the amount of the materials conveyed by the first storage tank 20 and the second storage tank 30.

In the aforementioned fuel cell system 1, the first material (electrolyte) and the second material (metal particles) could respectively and corresponding pass through the independent first flow passage 112 and second flow passage 113 on the casing 110 of the modular fuel cell structure 10, being delivered to the reaction vessel 111 of the casing 110 for electrochemical reaction. After the reaction, the materials would be exhausted into the retrieval device 50 through the also independent third flow passage 114 on the casing 110. With this circulating method for replenishing materials, and with the design of the independent first flow passage 112, second flow passage 113, and third flow passage 114 in the modular fuel cell structure 10, the metal particles could be timely replenished into the reaction vessel 111 to perform electrochemical reaction with the electrolyte in an even manner. At the same time, through the even scouring action of the electrolyte, the metal oxides formed after the reaction could be carried away immediately, which could prevent the metal oxides from precipitating in the casing 110. In this way, the reaction area of the metal particles could be effectively utilized, whereby the efficiency of electricity generation could be improved.

According to the above description, the modular fuel cell structure disclosed in the present invention could stably supply the appropriate amount of the first material and the second material at the same time. In other words, the amount of the first material and the amount of the second material provided to the modular structure would be regulated independently without interfering with each other. In comparison with the conventional fuel cell structure, the supply amount of the first material and the second material could be controlled more efficiently, whereby the fuel cell could perform the electrochemical reaction in the electrolyte with better material proportions. As a result, the reaction of the fuel cell would be more homogeneous and more stable.

Figure 7:
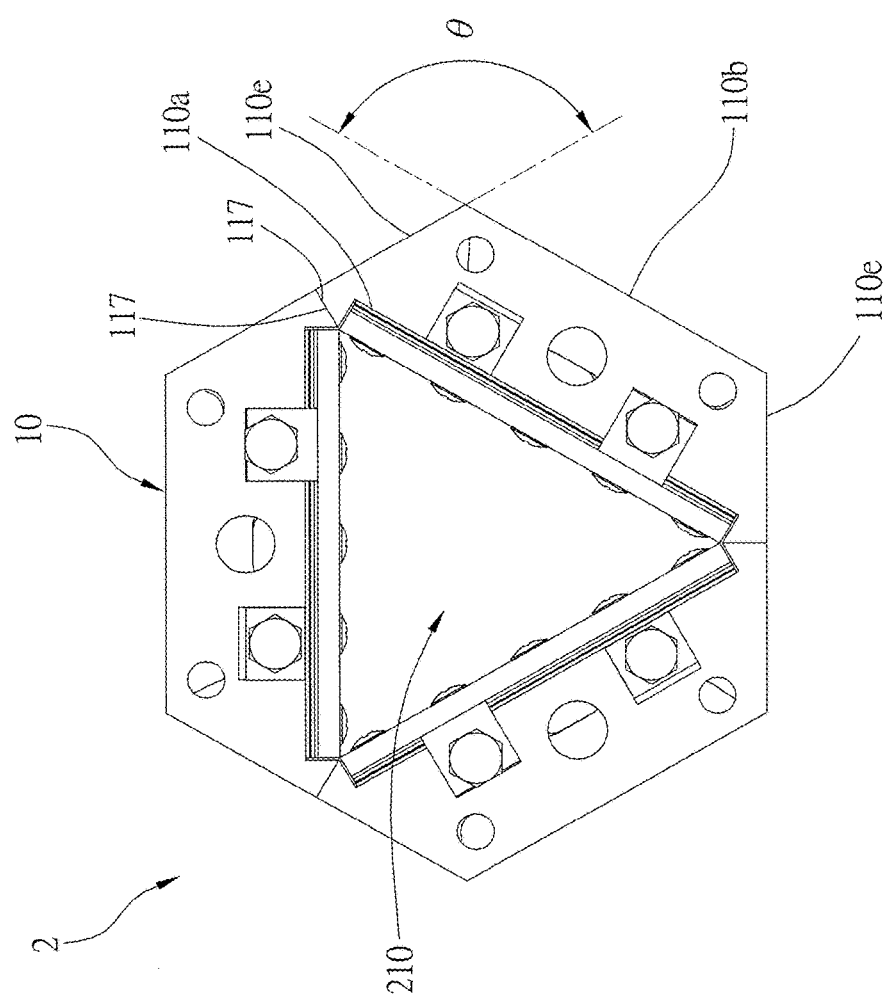

It is worth mentioning that, as shown in FIG. 3 and FIG. 7, the casing 110 of the modular fuel cell structure 10 disclosed in the present invention further includes two opposite side surfaces 110e, which are respectively disposed on two opposite sides of the casing 110. Four edges of each of the side surfaces 110e are connected to the first surface 110a, the second surface 110b, the first end face 110c, and the second end face 110d, wherein a distance between the two side surfaces 110e could also, optionally, gradually decreases in a direction from the first surface 110a toward the second surface 110b. By here, an included angle is formed between each of the side surfaces 110e and the second surface 110b, respectively. For example, said included angle could be 120 degrees. With such design, it would be easy to arrange and assemble more than one modular fuel cell structure 10, and the space occupied by the assembled modular fuel cell structure would be compact (as shown in FIG. 7).

In addition, in the modular fuel cell structure 10, the first surface 110a of the casing 110 could be further provided with two wing plates 117, each of which stands on one of two opposite lateral edges of the first surface 110a, respectively, extending in a direction from the first end face 110c toward the second end face 110d, wherein the wing plates 117 could be, but not limited to, disposed on the first surface 110a in a symmetrical manner. In the current embodiment of the present invention, the two wing plates 117 have the same thickness, and have the same height on the first surface 110a. However, the equal thickness and height are designed so as an example, which is not a limitation of the present invention.

With the wing plates 117, the anode conductive sheet, the anode conductive grid, the liner, the separating membrane, the air electrode sheet, the cathode conductive sheet, and the cover plate are confined between the two wing plates 117, which would enhance the stability and structural strength of the modular fuel cell structure 10. Furthermore, while assembling more than one modular fuel cell structure 10, the wing plates 117 could be used as binding mediums. As illustrated in FIG. 7, three modular fuel cell structures 10 are assembled with their first surfaces 110a facing inside, wherein the two wing plates 117 between each two modular fuel cell structures 10 are mutually bonded to form a hexagonal-structured modular fuel cell stack 2. Furthermore, a proper space could be reserved at a central of the modular fuel cell stack 2 as an air channel 210, which would effectively improve the circulation of the outside air in the modular fuel cell stack 2, whereby to benefit the exchange reaction between the air electrode and the outside air. The air channel 210 could be also used as a heat exchange path to enhance the heat dissipation effect. In addition, the anode contacts and the cathode contacts of adjacent modular fuel cell structures are all located on the first end face 110c of the casing 110, being immediately adjacent to each other. Therefore, such design would provide rather a high convenience while assembling multiple modular fuel cell structures 10 or modular fuel cell stacks 2 in series.

As shown in FIG. 8, since the modular fuel cell stack 2 composed of multiple modular fuel cell structures 10 has a hexagonal structure, it would have a quite high degree of freedom for being arranged. Specifically, more than one modular fuel cell stack 2 could be combined and stacked to form a honeycomb structure, which would have high structural strength, and would occupy less space.

In the above description of the present invention, the structure and the potential benefits of the modular fuel cell structure, the casing thereof, and the fuel cell system are explained in details. All equivalent structures which employ the concepts disclosed in this specification and the appended claims should fall within the scope of the present invention.

What is claimed is:

1. A modular fuel cell structure, which is adapted for injecting a first material and a second material for reaction; comprising:

a casing, which has a reaction vessel recessed into a surface thereof, and has a first flow passage, a second flow passage, and a third flow passage provided therein, which all communicate with the reaction vessel, wherein the first flow passage is adapted for delivering the first material into the reaction vessel, the second flow passage is adapted for delivering the second material into the reaction vessel, and the third flow passage is adapted to exhaust the first material and the second material out from the reaction vessel after reaction;

an anode conductive sheet disposed in the reaction vessel;

an air electrode sheet disposed on a side of the anode conductive sheet opposite to the reaction vessel;

a separating membrane disposed between the anode conductive sheet and the air electrode sheet to electrically separate the anode conductive sheet and the air electrode sheet; and a cathode conductive sheet disposed on the air electrode sheet, wherein the cathode conductive sheet is electrically connected to the air electrode sheet;

wherein the casing has a first surface, a second surface opposite to the first surface, a first end face, and a second end face opposite to the first end face; the first end face and the second end face are both connected to the first surface and the second surface, wherein the reaction vessel is formed on the first surface, and is recessed in a direction toward the second surface; one end of the first flow passage is exposed on a side of the casing near the first end face, while another end thereof communicates with a side of the reaction vessel near the second end face; one end of the second flow passage is exposed on the side of the casing near the first end face, while another end thereof communicates with another side of the reaction vessel near the first end face; one end of the third flow passage communicates with the another side of the reaction vessel near the first end face, while another end thereof is exposed on the side of the casing near the first end face;

wherein the casing further has two opposing side surfaces; a periphery of each of the side surfaces is connected to the first surface, the second surface, the first end face, and the second end face, wherein a distance between the two side surfaces gradually decreases in a direction from the first surface toward the second surface.

2. The modular fuel cell structure of claim 1, wherein the casing has a first wall, a second wall facing the first wall, a third wall, and a fourth wall facing the third wall in the reaction vessel thereof; the third wall and the fourth wall are both connected to the first wall and the second wall, and respectively correspond to the first end face and the second end face; the another end of the first flow passage which communicates with the reaction vessel is either on the first wall, on the second wall, or both, and is near the fourth wall; the another end of the second flow passage which communicates with the reaction vessel is on the third wall; the end of the third flow passage which communicates with the reaction vessel is on the second wall.

3. The modular fuel cell structure of claim 1, wherein an included angle between each of the side surfaces and the second surface is 120 degrees.

4. The modular fuel cell structure of claim 1, further comprising two wing plates provided on the first surface, each of which respectively stands on one of two opposite lateral edges of the first surface, and extends in a direction from the first end face toward the second end face, wherein the air electrode sheet, the separating membrane, and the cathode conductive sheet are confined between the wing plates.

5. The modular fuel cell structure of claim 1, wherein the casing has a slit communicating with the reaction vessel; the anode conductive sheet comprises an anode reaction portion and an anode conduct portion which are connected to each other; the anode reaction portion is disposed in the reaction vessel, while the anode conduct portion extends into the slit, and extends out of the casing through the slit.

6. The modular fuel cell structure of claim 1, further comprising an anode conductive grid disposed between the anode conductive sheet and the separating membrane to cover the anode conductive sheet, wherein the anode conductive grid has at least one folded edge, which is bent in a direction toward the anode conductive sheet, extending into the reaction vessel.

7. The modular fuel cell structure of claim 1, further comprising a liner disposed between the separating membrane and the reaction vessel, wherein the liner has an opening corresponding to the reaction vessel.

8. The modular fuel cell structure of claim 1, further comprising a cover plate disposed on a side of the cathode conductive sheet opposite to the air electrode sheet, wherein the cover plate is fixed to the casing; the anode conductive sheet, the air electrode sheet, the separating membrane, and the cathode conductive sheet are clamped and fixed between the casing and the cover plate.

9. The modular fuel cell structure of claim 1, wherein the air electrode sheet comprises a plate and a waterproof membrane; the waterproof membrane is disposed on the plate, with a part of the plate being exposed out; the cathode conductive sheet comprises a cathode reaction portion and a hollow portion, wherein the hollow portion corresponds to the waterproof membrane, and the cathode reaction portion is in contact with the part of plate which is exposed out.

10. A casing of a modular fuel cell adapted for injecting a first material and a second material for reaction, wherein the casing has a first surface, a second surface opposite to the first surface, a first end face, and a second end face opposite to the first end face; the first end face and the second end face are both connected to the first surface and the second surface; comprising:

a reaction vessel, which is provided on the first surface, and is recessed in a direction toward the second surface, wherein the reaction vessel is adapted for mixing the first material and the second material;

a first flow passage adapted for delivering the first material into the reaction vessel, wherein one end of the first flow passage is exposed on a side of the casing near the first end face, and another end thereof communicates with a side of the reaction vessel near the second end face;

a second flow passage adapted for delivering the second material into the reaction vessel, one end of the second flow passage is exposed on the side of the casing near the first end face, and another end thereof communicates with another side of the reaction vessel near the first end face; and a third flow passage, wherein one end of the third flow passage communicates with the another side of the reaction vessel near the first end face, and another end thereof is exposed on the side of the casing near the first end face; the third flow passage is adapted to exhaust the first material and the second material out from the reaction vessel after reaction, wherein the casing further comprises two opposing side surfaces provided on the two opposite sides of the casing, wherein a periphery of each of the side surfaces is connected to the first surface, the second surface, the first end face, and the second end face, wherein a distance between the two side surfaces gradually decreases in a direction from the first surface toward the second surface.

11. The casing of claim 10, further comprising a first wall, a second wall facing the first wall, a third wall, and a fourth wall facing the third wall in the reaction vessel, wherein the third wall and the fourth wall are both connected to the first wall and the second wall, and respectively correspond to the first end face and the second end face; the another end of the first flow passage which communicates with the reaction vessel is either on the first wall, on the second wall, or both, and is near the fourth wall; the another end of the second flow passage which communicates with the reaction vessel is on the third wall; the end of the third flow passage which communicates with the reaction vessel is on the second wall.

12. The casing of claim 10, wherein an included angle between each of the side surfaces and the second surface is 120 degrees.

13. The casing of claim 10, further comprising two wing plates provided on the first surface, each of which respectively stands one of two opposite lateral edges of the first surface, and extends in a direction from the first end face toward the second end face.

14. A fuel cell system, comprising:
a modular fuel cell structure, comprising:
a casing, which has a reaction vessel recessed into a surface thereof, and has a first flow passage, a second flow passage, and a third flow passage provided therein, which all communicate with the reaction vessel, wherein the first flow passage is adapted for delivering a first material into the reaction vessel for reaction, the second flow passage is adapted for delivering a second material into the reaction vessel for reaction, and the third flow passage is adapted to exhaust the first material and the second material out from the reaction vessel after reaction;
an anode conductive sheet disposed in the reaction vessel;
an air electrode sheet disposed on a side of the anode conductive sheet opposite to the reaction vessel;
a separating membrane disposed between the anode conductive sheet and the air electrode sheet to separate the anode conductive sheet and the air electrode sheet; and
a cathode conductive sheet disposed on the air electrode sheet, wherein the cathode conductive sheet is electrically connected to the air electrode sheet;
a first storage tank connected to the first flow passage, wherein the first storage tank is adapted for storing the first material, which is delivered into the reaction vessel through the first flow passage;
a second storage tank connected to the second flow passage, wherein the second storage tank is adapted for storing the second material, which is delivered into the reaction vessel through the second flow passage;
a retrieval device connected to the third flow passage, wherein the retrieval device is adapted to collect the first material and the second material from the modular fuel cell structure after reaction; and
a feeding device, which is respectively connected to the first storage tank and the second storage tank, and is adapted to deliver the first material and the second material to the modular fuel cell structure;
wherein the casing has a first surface, a second surface opposite to the first surface, a first end face, and a second end face opposite to the first end face; the first end face and the second end face are both connected to the first surface and the second surface, wherein the reaction vessel is formed on the first surface, and is recessed in a direction toward the second surface; one end of the first flow passage is exposed on a side of the casing near the first end face, while another end thereof communicates with a side of the reaction vessel near the second end face; one end of the second flow passage is exposed on the side of the casing near the first end face, while another end thereof communicates with another side of the reaction vessel near the first end face; one end of the third flow passage communicates with the another side of the reaction vessel near the first end face, while another end thereof is exposed on the side of the casing near the first end face;
wherein the casing further has two opposing side surfaces; a periphery of each of the side surfaces is connected to the first surface, the second surface, the first end face, and the second end face, wherein a distance between the two side surfaces gradually decreases in a direction from the first surface toward the second surface.

15. The fuel cell system of claim 14, further comprising a control module, which is respectively electrically connected to the modular fuel cell structure and the feeding device, and is adapted to detect electrical parameters of the modular fuel cell structure, wherein the control module controls the feeding device to adjust an amount of the first and the second materials delivered by the first storage tank and the second storage tank according to the detected electrical parameters.

16. The fuel cell system of claim 14, wherein the retrieval device is further connected to the first storage tank and the second storage tank; the retrieval device is also adapted to recycle at least one among the first material and the second material after reaction; when the first material is recycled by the retrieval device, the recycled first material is delivered to the first storage tank; when the second material is recycled the retrieval device, the recycled second material is delivered to the second storage tank.

17. The fuel cell system of claim 14, wherein the casing has a first wall, a second wall facing the first wall, a third wall, and a fourth wall facing the third wall in the reaction vessel, wherein the third wall and the fourth wall are both connected to the first wall and the second wall, and respectively correspond to the first end face and the second end face; an end of the first flow passage is on the first end face, while another end thereof is either on the first wall, on the second wall, or both, and is near the second end face; an end of the second flow passage is on the first end face, and another end thereof is on the third wall; an end of the third flow passage is on the first end face, and another end thereof is on the second wall.

18. A modular fuel cell structure, which is adapted for injecting a first material and a second material for reaction; comprising:
a casing, which has a reaction vessel recessed into a surface thereof, and has a first flow passage, a second flow passage, and a third flow passage provided therein, which all communicate with the reaction vessel, wherein the first flow passage is adapted for delivering the first material into the reaction vessel, the second flow passage is adapted for delivering the second material into the reaction vessel, and the third flow passage is adapted to exhaust the first material and the second material out from the reaction vessel after reaction;
an anode conductive sheet disposed in the reaction vessel;
an air electrode sheet disposed on a side of the anode conductive sheet opposite to the reaction vessel;
a separating membrane disposed between the anode conductive sheet and the air electrode sheet to electrically separate the anode conductive sheet and the air electrode sheet; and
a cathode conductive sheet disposed on the air electrode sheet, wherein the cathode conductive sheet is electrically connected to the air electrode sheet;
wherein the modular fuel cell structure further comprises an anode conductive grid disposed between the anode conductive sheet and the separating membrane to cover the anode conductive sheet, wherein the anode conductive grid has at least one folded edge, which is bent in a direction toward the anode conductive sheet, extending into the reaction vessel.

19. The modular fuel cell structure of claim 18, wherein the casing has a first surface, a second surface opposite to the first surface, a first end face, and a second end face opposite to the first end face; the first end face and the second end face are both connected to the first surface and the second surface, wherein the reaction vessel is formed on the first surface, and is recessed in a direction toward the second surface; one end of the first flow passage is exposed on a side of the casing near the first end face, while another end thereof communicates with a side of the reaction vessel near the second end face; one end of the second flow passage is exposed on the side of the casing near the first end face, while another end thereof communicates with another side of the reaction vessel near the first end face; one end of the third flow passage communicates with the another side of the reaction vessel near the first end face, while another end thereof exposed on the side of the casing near the first end face.

20. The modular fuel cell structure of claim 19, wherein the casing has a first wall, a second wall facing the first wall, a third wall, and a fourth wall facing the third wall in the reaction vessel thereof; the third wall and the fourth wall are both connected to the first wall and the second wall, and respectively correspond to the first end face and the second end face; the another end of the first flow passage which communicates with the reaction vessel is either on the first wall, on the second wall, or both, and is near the fourth wall; the another end of the second flow passage which communicates with the reaction vessel is on the third wall; the end of the third flow passage which communicates with the reaction vessel is on the second wall.

21. The modular fuel cell structure of claim 19, wherein the casing further has two opposing side surfaces; a periphery of each of the side surfaces is connected to the first surface, the second surface, the first end face, and the second end face, wherein a distance between the two side surfaces gradually decreases in a direction from the first surface toward the second surface.

22. The modular fuel cell structure of claim 21, wherein an included angle between each of the side surfaces and the second surface is 120 degrees.

23. The modular fuel cell structure of claim 19, further comprising two wing plates provided on the first surface, each of which respectively stands on one of two opposite lateral edges of the first surface, and extends in a direction from the first end face toward the second end face, wherein the air electrode sheet, the separating membrane, and the cathode conductive sheet are confined between the wing plates.

24. The modular fuel cell structure of claim 18, wherein the casing has a slit communicating with the reaction vessel; the anode conductive sheet comprises an anode reaction portion and an anode conduct portion which are connected to each other; the anode reaction portion is disposed in the reaction vessel, while the anode conduct portion extends into the slit, and extends out of the casing through the slit.

25. The modular fuel cell structure of claim 18, further comprising a liner disposed between the separating membrane and the reaction vessel, wherein the liner has an opening corresponding to the reaction vessel.

26. The modular fuel cell structure of claim 18, further comprising a cover plate disposed on a side of the cathode conductive sheet opposite to the air electrode sheet, wherein the cover plate is fixed to the casing; the anode conductive sheet, the air electrode sheet, the separating membrane, and the cathode conductive sheet are clamped and fixed between the casing and the cover plate.

27. The modular fuel cell structure of claim 18, wherein the air electrode sheet comprises a plate and a waterproof membrane; the waterproof membrane is disposed on the plate, with a part of the plate being exposed out; the cathode conductive sheet comprises a cathode reaction portion and a hollow portion, wherein the hollow portion corresponds to the waterproof membrane, and the cathode reaction portion is in contact with the part of plate which is exposed out.

28. A fuel cell system, comprising:
a modular fuel cell structure, comprising:
a casing, which has a reaction vessel recessed into a surface thereof, and has a first flow passage, a second flow passage, and a third flow passage provided therein, which all communicate with the reaction vessel, wherein the first flow passage is adapted for delivering a first material into the reaction vessel for reaction, the second flow passage is adapted for delivering a second material into the reaction vessel for reaction, and the third flow passage is adapted to exhaust the first material and the second material out from the reaction vessel after reaction;
an anode conductive sheet disposed in the reaction vessel;
an air electrode sheet disposed on a side of the anode conductive sheet opposite to the reaction vessel;
a separating membrane disposed between the anode conductive sheet and the air electrode sheet to separate the anode conductive sheet and the air electrode sheet; and
a cathode conductive sheet disposed on the air electrode sheet, wherein the cathode conductive sheet is electrically connected to the air electrode sheet;
a first storage tank connected to the first flow passage, wherein the first storage tank is adapted for storing the first material, which is delivered into the reaction vessel through the first flow passage;
a second storage tank connected to the second flow passage, wherein the second storage tank is adapted for storing the second material, which is delivered into the reaction vessel through the second flow passage;
a retrieval device connected to the third flow passage, wherein the retrieval device is adapted to collect the first material and the second material from the modular fuel cell structure after reaction; and
a feeding device, which is respectively connected to the first storage tank and the second storage tank, and is adapted to deliver the first material and the second material to the modular fuel cell structure;
wherein the fuel cell system further comprises an anode conductive grid disposed between the anode conductive sheet and the separating membrane to cover the anode conductive sheet, wherein the anode conductive grid has at least one folded edge, which is bent in a direction toward the anode conductive sheet, extending into the reaction vessel.

29. The fuel cell system of claim 28, further comprising a control module, which is respectively electrically connected to the modular fuel cell structure and the feeding device, and is adapted to detect electrical parameters of the modular fuel cell structure, wherein the control module controls the feeding device to adjust an amount of the first and the second materials delivered by the first storage tank and the second storage tank according to the detected electrical parameters.

30. The fuel cell system of claim 28, wherein the retrieval device is further connected to the first storage tank and the second storage tank; the retrieval device is also adapted to recycle at least one among the first material and the second material after reaction; when the first material is recycled by the retrieval device, the recycled first material is delivered to the first storage tank; when the second material is recycled the retrieval device, the recycled second material is delivered to the second storage tank.

31. The fuel cell system of claim 28, wherein the casing has a first surface, a second surfaces opposite to the first surface, a first end face, and a second end face opposite to the first end face; the first end face and the second end face are both connected to the first surface and the second surface, wherein the reaction vessel is formed on the first surface, and is recessed in a direction toward the second surface; the casing has a first wall, a second wall facing the first wall, a third wall, and a fourth wall facing the third wall in the reaction vessel, wherein the third wall and the fourth wall are both connected to the first wall and the second wall, and respectively correspond to the first end face and the second end face; an end of the first flow passage is on the first end face, while another end thereof is either on the first wall, on the second wall, or both, and is near the second end face; an end of the second flow passage is on the first end face, and another end thereof is on the third wall; an end of the third flow passage is on the first end face, and another end thereof is on the second wall.

* * * * *